July 21, 1970  R. B. BOSSLER, JR  3,521,465
FLEXIBLE COUPLING

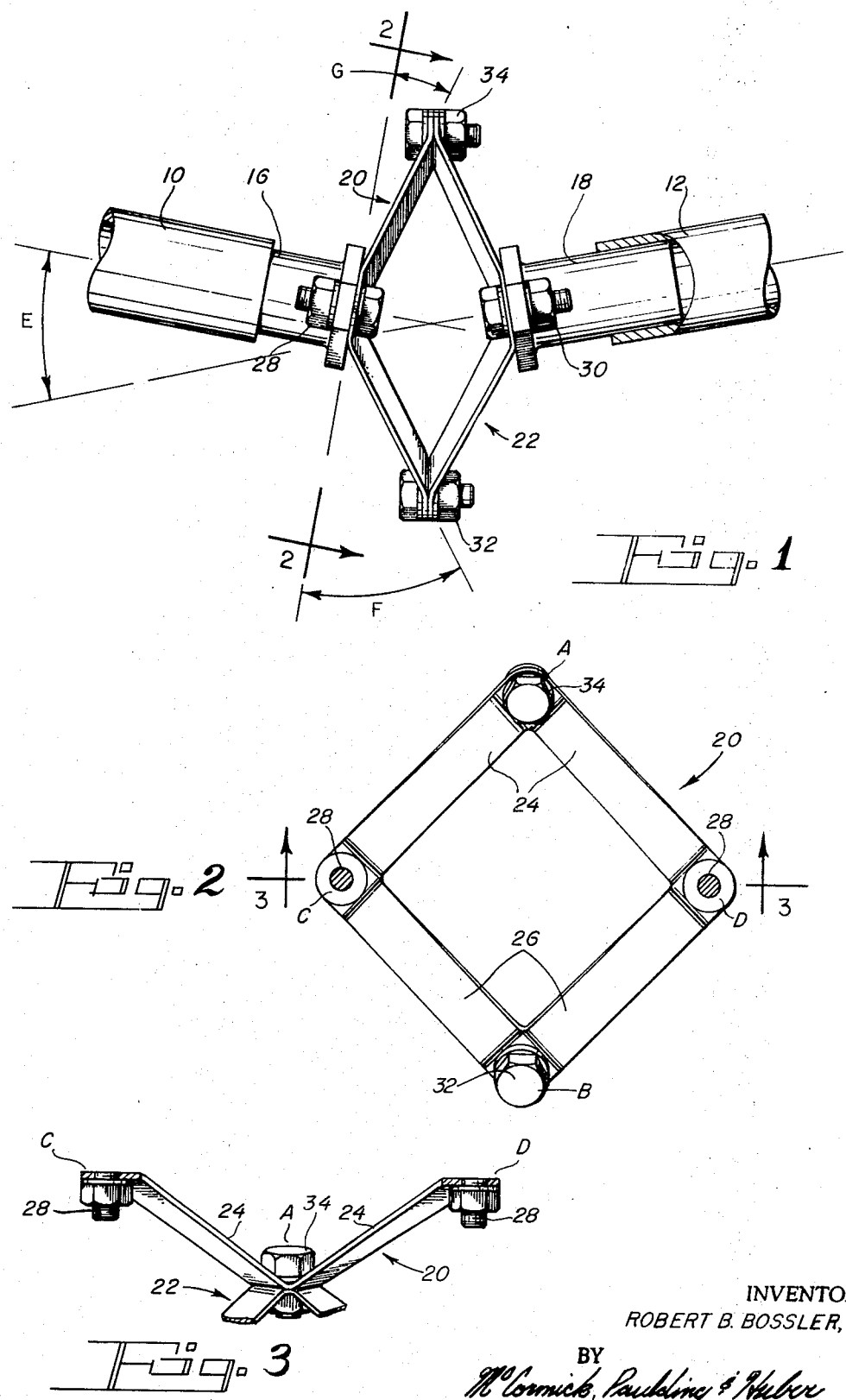

Filed Nov. 27, 1968  2 Sheets-Sheet 2

INVENTOR.
ROBERT B. BOSSLER, JR.
BY
McCormick, Paulding & Huber
attorneys

United States Patent Office 3,521,465
Patented July 21, 1970

3,521,465
FLEXIBLE COUPLING
Robert B. Bossler, Jr., Bloomfield, Conn., assignor to Kaman Corporation, Bloomfield, Conn., a corporation of Connecticut
Filed Nov. 27, 1968, Ser. No. 779,448
Int. Cl. F16d *3/56, 3/62*
U.S. Cl. 64—12                 6 Claims

ABSTRACT OF THE DISCLOSURE

A pair of misaligned shafts are provided with flanged fittings to which a pair of matched flexing elements are attached at corresponding corners. Each element is generally square when bent to shape, and is connected to the other corresponding corners of the other element. The flexing elements may be assembled in a prestressed condition.

SUMMARY OF INVENTION

This invention relates to flexible couplings, and deals more particularly with a coupling for use between permanently misaligned shafts which are to be oscillated through a portion of one revolution.

The general object of the present invention is to provide a flexible coupling wherein large installed misalignment between the drive and the driven shafts can be readily accommodated without variations in the angular velocity of the driven shaft, at least through angles of oscillation of the drive shaft significantly less than one complete revolution.

Another general object of the present invention is to provide a flexible coupling which includes a matched pair of flexing elements connected to one another to define a redundant space frame structure wherein two torque transmission paths are each individually capable of performing the required drive in the event that the other fails.

A more specific object of the present invention is to provide a flexible coupling which can be used to connect a plurality of short drive shafts arranged in series around the inlet of a jet engine or the like to control doors or other geometrical trimimng devices, the fail-safe design of the coupling when combined with the limitation to small angular displacements making a coupling of the present invention particularly advantageous in such an installation.

BRIEF DESCRIPTION OF THE DRAWINGS

FIG. 1 is an elevational view of a flexible coupling constructed in accordance with the present invention, and connecting two shafts which are permanently misaligned.

FIG. 2 is a plan view of one of the two unsymmetrically bent flexing elements comprising the coupling of FIG. 1.

FIG. 3 is a sectional view on the line 3—3 of FIG. 2.

DETAILED DESCRIPTION

Figure 4:
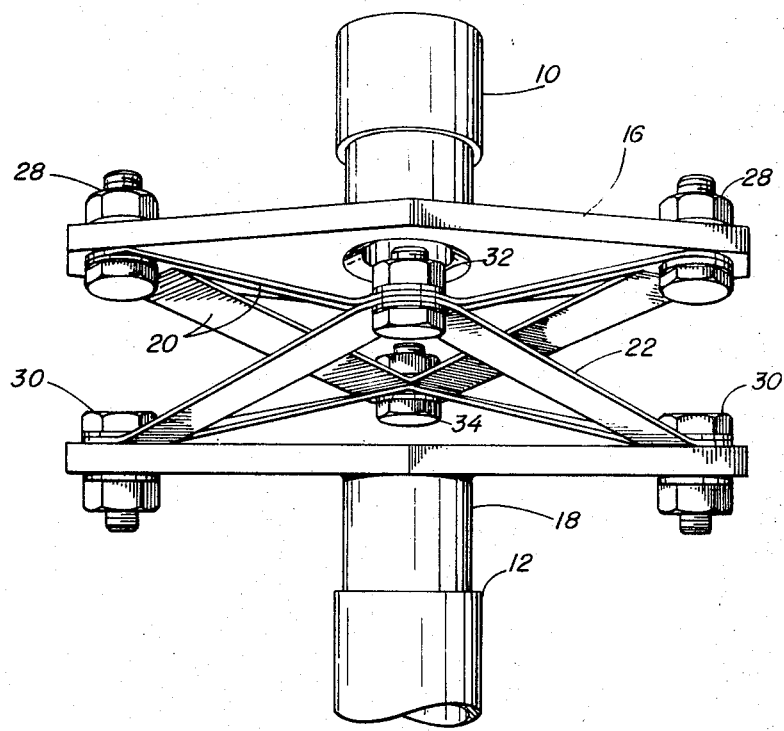
FIG. 4 is a top view of the coupling showing in perspective the general arrangement of the two flexing elements and the fittings for attaching these elements to the misaligned shafts.

Turning now to the drawings in greater detail, FIG. 1 shows a pair of permanently misaligned shafts 10 and 12, one of which may comprise a drive member and the other a driven member, which members are to be connected to one another so that the one drives the other at substantially the same velocity.

In accordance with the present invention, fittings 16 and 18 are provided in the respective end portions of the shafts 10 and 12, and each fitting has diametrically opposed radially outwardly extending flanges to receive the elements of the coupling. These flanged fittings 16 and 18 are aligned with one another and extend radially outwardly in common lateral directions as best shown in FIG. 4 so that they are arranged in their midtravel positions at least substantially perpendicularly with respect to the plane defined by the misaligned axes of rotation of the misaligned shafts 10 and 12. These shafts are misaligned with one another by an angle E. Thus, in the midtravel position of these shafts and fittings, the radially outwardly extending flanges are arranged at right angles to the plane defined by the angularly misaligned shafts. The coupling to be described is designed to transmit relatively small angular rotations of the shafts in either direction from the position shown.

In further accordance with the present invention, a matched pair of generally square flexing elements 20 and 22 comprising left and right-hand portions of the coupling are provided between the flanged fittings 16 and 18. As best shown in FIG. 2, each of these flexing elements appears as a square when viewed along the axis of rotation of its respective shaft, and includes unsymmetrically bent inside and outside triangular portions, 24 and 26 respectively, arranged on opposite sides of the intersecting axes of oscillation of the misaligned shafts. Each triangular portion is defined by two inside and two outside leg portions integrally connected at their ends to form inside and outside vertices or corners A and B, respectively, of the flexing element. Each flexing element has another set of diagonally opposed vertices C and D attached to its associated flanged fitting by screws 28, 28. The corresponding set of opopsed vertices on the other flexing element are similarly attached to the flanged fitting 18 by screws 30, 30. The outside triangular portions 26, 26 of both flexing elements are bent out of the respective radial planes defined by their associated flanged fittings through an angle F, as shown in FIG. 1, and attachment means are provided for joining the outside triangular portions of these flexing elements as shown at 32. The inside triangular portions 24, 24 of these flexing elements are also bent out of the radial plane defined by their respective flanged fittings through an angle G as shown in FIG. 1, and attachment means are provided for joining the inside triangular portions of these flexing elements as shown at 34. Angles F and G are not equal.

It is an important feature of the present invention that the required torque can be transmitted through the required angle by either the inside or outside triangular portions of a flexing element in the event of a failure in either portion. The two torque transmission paths are each similar to torque scissors devices.

The outside triangular portions 26, 26 may be prebent through a slightly smaller angle or a slightly larger angle than required to assemble the elements as shown, so that these elements, when assembled, are prestressed to cause the coupling to tend to rest in the position shown or to resist coming to rest in the position shown. The prebent angle modification also may be used to modify the stress exposure caused by coupling rotation. It should be noted that the coupling shown is intended for use through a total angular rotation of 45° or through angles either side of the midtravel position shown of 22½°. In further accordance with the present invention, the inside triangular portions 24, 24 also may be prebent through an angle larger or smaller than that required to assemble these elements to achieve the same objectives described for the outside triangular portions.

I claim:
1. A flexible coupling for transmitting oscillating motion between drive and driven members which are permanently misaligned with respect to one another, said coupling comprising fittings for said drive and driven members respectively, each fitting having diametrically opposed radially outwardly extending flanges, a matched pair of four-sided flexing elements having corresponding sets of diagonally opposed vertices attached respectively to said flanged fittings, each of said flexing elements having two inside and two outside leg portions integrally connected at their ends to form inside and outside triangular portions arranged on opposite sides of the intersecting axes of oscillation of said misaligned members, said outside triangular portions being bent out of the respective radial planes defined by said flanged fittings, attachment means for joining said outside and said inside triangular portions of said respective flexing elements to one another, said inside and said outside triangular portions of each of said flexing elements comprising a quadrilateral shape when viewed along the respective axes of rotation of said misaligned members.

2. The combination defined in claim 1 wherein said leg portions appear to be of equal length when viewed along said respective member axes.

3. The combination defined in claim 1 wherein said flexing elements appear to be geometrically square when viewed along said member axes.

4. The combination defined in claim 1 wherein said inside triangular portions are also bent out of the respective radial planes defined by said flanged fittings.

5. The combination defined in claim 4 wherein all of said leg portions appear to be at equal length when viewed along their respective member axes.

6. The combination defined in claim 4 wherein said flexing elements appear to be geometrically square when viewed along said member axes.

References Cited

UNITED STATES PATENTS

| | | | |
|---|---|---|---|
| 539,161 | 5/1895 | Almond | 64—15 |
| 1,025,875 | 5/1912 | Lambert | 64—12 |
| 1,406,361 | 2/1922 | Forsyth | 64—12 |
| 1,734,988 | 11/1929 | Wilson | 64—12 |

FOREIGN PATENTS

| | | |
|---|---|---|
| 4,395 | 1891 | Great Britain. |
| 628,664 | 9/1949 | Great Britain. |

JAMES A. WONG, Primary Examiner

U.S. Cl. X.R.

64—15